US007200230B2

(12) United States Patent
Knauft

(10) Patent No.: US 7,200,230 B2
(45) Date of Patent: Apr. 3, 2007

(54) SYSTEM AND METHOD FOR CONTROLLING AND ENFORCING ACCESS RIGHTS TO ENCRYPTED MEDIA

(75) Inventor: Christopher L. Knauft, San Diego, CA (US)

(73) Assignee: Macrovision Corporation, Sunnyvale, CA (US)

( * ) Notice: Subject to any disclaimer, the term of this patent is extended or adjusted under 35 U.S.C. 154(b) by 770 days.

(21) Appl. No.: 09/760,956

(22) Filed: Jan. 15, 2001

(65) Prior Publication Data

US 2001/0029581 A1 Oct. 11, 2001

Related U.S. Application Data

(60) Provisional application No. 60/195,166, filed on Apr. 6, 2000.

(51) Int. Cl.
*H04N 7/167* (2006.01)
(52) U.S. Cl. .................. 380/201; 380/45; 380/202; 380/203; 380/210; 380/211; 380/231; 380/232; 713/165; 713/172; 713/182; 713/193; 705/54; 705/57; 705/71
(58) Field of Classification Search ........ 380/200–203, 380/210–211, 231–232, 259, 30, 45; 713/165, 713/172, 182, 193; 705/54, 57, 51, 71
See application file for complete search history.

(56) References Cited

U.S. PATENT DOCUMENTS 4,634,807 A 1/1987 Chorley et al.

(Continued)

FOREIGN PATENT DOCUMENTS

| EP | 0773490 | 5/1997 |
|----|---------|--------|
| GB | 2149944 A | 6/1985 |
| JP | 03-040689 | 2/1991 |
| JP | 03-075983 | 3/1991 |
| JP | 07-093148 | 4/1995 |

OTHER PUBLICATIONS

WIBU-Key, User's Guide Version 2.50 (URL) WIBU Jul. 1998 XP002139265.

(Continued)

*Primary Examiner*—Kambiz Zand
*Assistant Examiner*—Tongoc Tran
(74) *Attorney, Agent, or Firm*—David S. Park; MacPherson Kwok Chen Heid LLP

(57) ABSTRACT

A system for providing rights controlled access to digital media comprises a server data processor and a client data processor connected by a communications network. The user data processor provides access to a data object in accordance with rules associated with the data object by the server data processor. The client data processor comprises a machine key device and a user key device. The machine key device is preferably an installed component of the client data processor that provides encryption, decryption, and authentication functionality for the client data processor. The user key device is preferably a removable, portable device that connects to the client data processor and provides encryption, decryption, and authentication functionality for the user. A method restricts the use of a data object to a particular user and a particular data processor through the use of additional layers of encryption. The method preferably comprises encrypting a data object such that the it can be decrypted by the machine key device, and further encrypting the data object such that it can be decrypted by the user key device. A method restricts the use of a data object to a particular user and a particular data processor through the use of rules that require authentication of the machine key device and the user key device.

39 Claims, 13 Drawing Sheets

U.S. PATENT DOCUMENTS

| | | |
|---|---|---|
| 5,222,133 A | 6/1993 | Chou |
| 5,319,705 A | 6/1994 | Halter et al. |
| 5,321,841 A | 6/1994 | East et al. |
| 5,325,430 A | 6/1994 | Smyth |
| 5,337,357 A | 8/1994 | Chou |
| 5,646,999 A * | 7/1997 | Saito .......................... 705/54 |
| 5,666,411 A | 9/1997 | McCarty |
| 5,784,460 A | 7/1998 | Blumenthal et al. |
| 5,845,281 A | 12/1998 | Benson |
| 5,857,021 A | 1/1999 | Kataok |
| 5,867,579 A * | 2/1999 | Saito .......................... 705/57 |
| 5,892,900 A | 4/1999 | Ginter et al. |
| 5,920,861 A | 7/1999 | Hall et al. |
| 5,933,498 A | 8/1999 | Schneck et al. |
| 6,148,404 A * | 11/2000 | Yatsukawa ................. 713/200 |
| 6,282,649 B1 * | 8/2001 | Lambert et al. ........... 713/167 |
| 6,470,085 B1 * | 10/2002 | Uranaka et al. ........... 380/231 |
| 6,502,130 B1 * | 12/2002 | Keeler et al. ............... 709/223 |
| 6,550,011 B1 * | 4/2003 | Sims, III .................... 713/193 |
| 6,629,150 B1 * | 9/2003 | Huded ........................ 709/247 |
| 6,671,808 B1 * | 12/2003 | Abbott et al. ............... 713/200 |
| 6,731,756 B1 * | 5/2004 | Pizano et al. ............... 380/201 |
| 6,744,894 B1 * | 6/2004 | Saito .......................... 380/277 |
| 6,772,340 B1 * | 8/2004 | Peinado et al. ............. 713/168 |
| 6,775,655 B1 * | 8/2004 | Peinado et al. ............. 705/59 |
| 6,831,982 B1 * | 12/2004 | Hughes et al. ............. 380/281 |
| 6,857,076 B1 * | 2/2005 | Klein .......................... 713/189 |

OTHER PUBLICATIONS

International Search Report for PCT/US01/10496 (3-pages).
WIBU Systems Products, The WIBU-Key Software Protection System, http://web.archive.org/web/19970130095920/www.wibu.de/english/products.htm/Dec 7, 2005, pp. 1-5.

* cited by examiner

SYSTEM AND METHOD FOR CONTROLLING AND ENFORCING ACCESS RIGHTS TO ENCRYPTED MEDIA

PRIORITY INFORMATION

This application claims the benefit of U.S. Provisional Application No. 60/195,166, filed on Apr. 6, 2000, for "SYSTEM AND METHOD FOR CONTROLLING AND ACCESS RIGHTS TO ENCRYPTED MEDIA."

BACKGROUND OF THE INVENTION

1. Field of the Invention

This invention relates generally to controlling and enforcing access rights to data objects and, more particularly, the invention relates to restricting the use of a data object to particular data processors and/or users.

2. Description of the Related Art

Digital representations of media include text files, digital audio, digital video, digital images, and digital multimedia files, among others. The benefits of these media representations and their associated technologies are manifold. These digital representations of media have enabled significant advances in the reproduction, distribution, and use/presentation of the media. There are, however, drawbacks associated with these representations. Digital media is easily copied and/or reproduced, making unauthorized copying or use difficult to control. Ease of transmission also makes unauthorized distribution difficult to control.

Systems have been developed to address the problem of controlling and securely maintaining one's ownership rights in digital media, while still permitting use of the digital media by others. One system is described in U.S. Pat. No. 5,845,281, METHOD AND SYSTEM FOR MANAGING A DATA OBJECT SO AS TO COMPLY WITH PREDETERMINED CONDITIONS FOR USAGE, which issued Dec. 1, 1998 to Benson et al., and is assigned to the assignee of the present application. Another system is described in U.S. Pat. No. 5,892,900, SYSTEMS AND METHODS FOR SECURE TRANSACTION MANAGEMENT AND ELECTRONIC RIGHTS PROTECTION, which issued Apr. 6, 1999 to Ginter et al.

Existing systems generally comprise a client program (user program) executing on a user computer and a server program (data packaging program) executing on a server computer. The computers are generally connected through a computer network. The server program packages a digital media representation (data object) along with a set of rules that govern the use of the data object, in a secure package. The secure package is encrypted such that only the client program can decrypt and use it. The secure package is then transmitted to the client program, which allows use of the data object in accordance with the prescribed rules of use. The data object may, for example, be a digital video file in MPEG format. In this case, the server program would package the video file and a set of rules governing the use of the file in a secure package. The server would then transmit the secure package to the client program. The client program would then likely display the video sequence in accordance with the rules associated with the file.

The limitations of the rules of use are generally delimited by the capabilities of the client program. In other words, a rule is typically an instruction to the client program to allow or not allow some action, or alternatively an instruction to perform an action. Accordingly, the client program needs to be able to understand and implement the actions prescribed by the rules. Typical client programs allow rules that specify such things as: a) how many times a data object can be used or presented, b) whether the data object can be copied, c) whether a hardcopy or printout of the data object can be made, if applicable. Other rules can be created, as long as the client program is capable of performing the associated actions on the device upon which the client program is running.

SUMMARY OF THE INVENTION

The present invention provides a system and associated methods for extending the capabilities of rights controlled access media systems. The system and methods provide for designation and authentication of the identity of the data processor upon/through which a data object is to be used. The system further provides for encryption of a data object and its associated rules such that only a designated data processor can decrypt and use the data object. The system and methods further provide for designation and authentication of the identity of a user by whom the data object is to be used. The system also provides for encryption of a data object and its associated rules such that only a designated user can decrypt and use the data object.

In one embodiment, the system comprises a data object provider data processor and a user data processor connected by a communications network. The user data processor preferably comprises a machine key device and a user key device. The machine key device is preferably an installed component of the user data processor that provides encryption, decryption, and authentication functionality for the user data processor. The user key device is preferably a removable, portable device that connects to the user data processor and provides encryption, decryption, and authentication functionality for the user.

In one embodiment, a method restricts the use of a data object to a particular user and a particular data processor through the use of additional layers of encryption. The method preferably comprises encrypting a data object such that it can be decrypted by the machine key device, and further encrypting the data object such that it can be decrypted by the user key device. This embodiment can also be applied outside the context of rights controlled access media systems to limit or restrict the use of a data object to a particular data processor or user. In this case, the rules typically associated with a data object need not be included and the encryption for the user and machine key devices serve as the limitations on the use of the data object.

In another embodiment, a method restricts the use of a data object to a particular user and a particular data processor through the use of rules that require authentication of the machine key device and the user key device. The method preferably comprises including a machine digital certificate within a set of rules and creating a rule that requires the authentication of a machine key device based upon the included machine digital certificate. The method preferably further comprises including a user digital certificate within a set of rules and creating a rule that requires the authentication of a user key device based upon the included user digital certificate.

BRIEF DESCRIPTION OF THE DRAWINGS

Referring now to the drawings in which like reference numbers represent corresponding components throughout.

DETAILED DESCRIPTION OF THE EMBODIMENTS

In the description that follows, a first and several alternative embodiments of the invention will be described in detail. As will be understood by one skilled in the art, features described with reference to alternative embodiments may also be applicable in the context of the first embodiment as well as other alternative embodiments.

I. General Overview

Figure 1A:
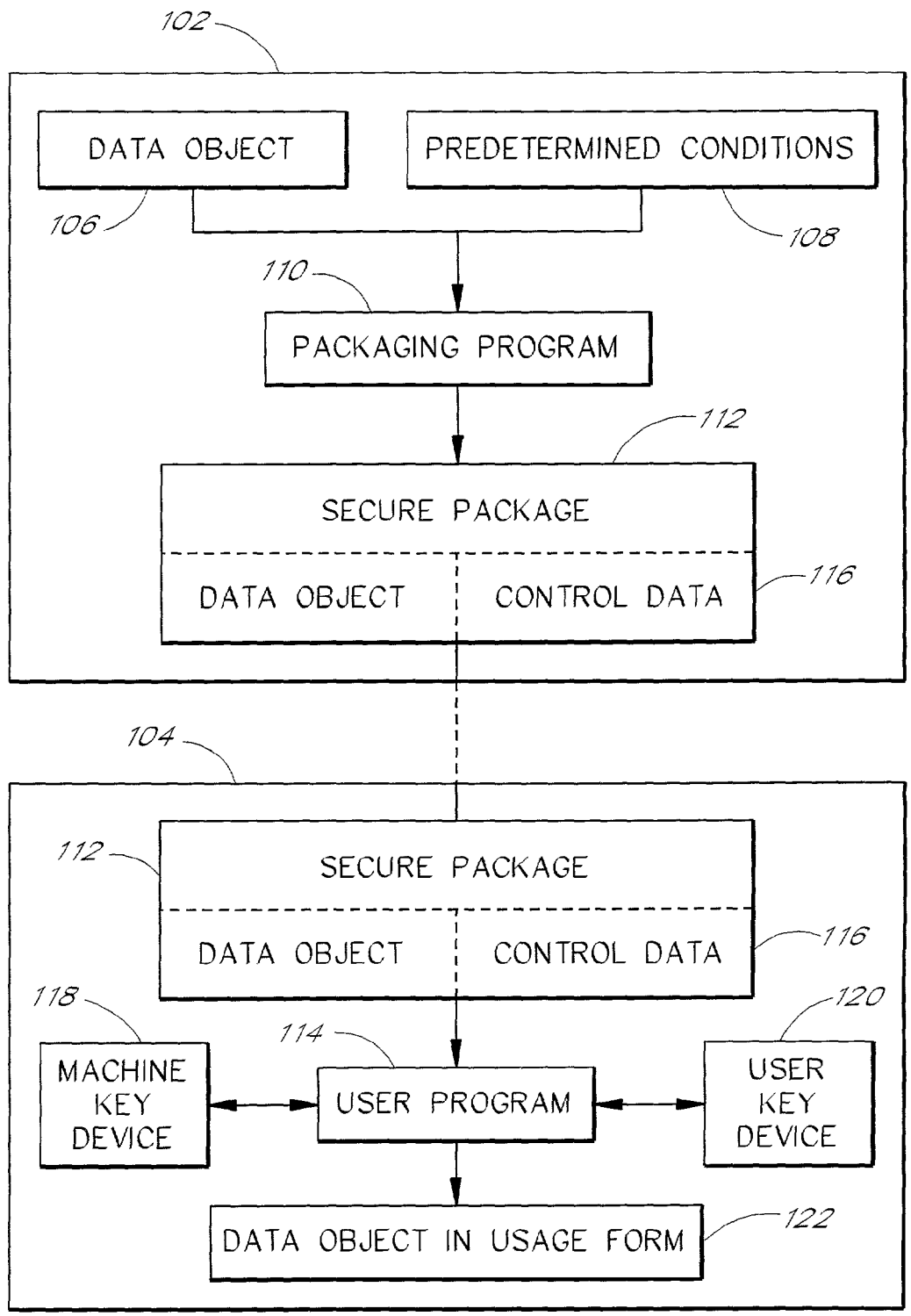
FIG. 1A is a flow diagram showing a general data flow according to a first embodiment of the invention.

FIG. 1A is a flow diagram showing the general data flow according to a first embodiment of the invention. The flow diagram is divided into a data object provider part 102 and a user part 104. In the first embodiment, the data object provider part 102 is generally performed through a data object provider data processor 200 (FIG. 2) and the user part 104 is generally performed through a user data processor 300 (FIG. 3).

In the data object provider part 102, a data object 106 is created by an author. The author also determines the conditions 108 for the usage of the data object 106 by a user. The data object 106 and the usage conditions 108 are input to a data packaging program 110, which creates a secure data package 112 of the data object 106 and of control data 116 which are based on the input usage conditions 108. Once packaged in this way, the data object 106 can only be accessed by a user program 114.

The data object 106 is packaged together with a set of control data 116. The control data 116 may be a general set of control data, which is the same for all users of the data object 106. This may be the case when the data object 106 is sent to a retailer or a bulletin board, wherefrom a user may obtain it. The data object 106 may also be packaged as a consequence of a request from a user for usage of the data object 106. In that case, the package may include control data 116, which is specifically adapted to that user. This control data 116 is called a user set of control data. It may for example comprise the number of usages purchased by the user. Typically, the user set of control data will be created on the basis of the general set of control data and include at least a subset thereof. A user set of control data 116 need not always be adapted for a specific user. All sets of control data 116 that are created on the basis of a general set of control data will be called a user set of control data. Thus, a set of control data 116 can be a general set in one phase and a user set in another phase.

The above-mentioned data packaging can be carried out by the author himself by means of the data packaging program 110. As an alternative, the author may send his data object 106 to a broker, who inputs the data object 106 and the usage conditions determined by the author to the data packaging program 110 in order to create a secure package 112. The author may also sell his data object 106 to the broker. In that case, the broker may apply its own usage conditions to the data packaging program 110. The author may also provide the data object 106 in a secure package to the broker, which repackages the data object 106 and adds further control data, which is relevant to its business activities. Various combinations of the above alternatives are also conceivable.

In the user part 104 of the flow diagram, a user program 114 receives the secure package 112. The user program 114 preferably interacts with a machine key device 118 and a user key device 120 in order to authenticate the identity of the user and/or user data processor and unpackage the secure package 112. Upon successful unpackaging, the user program 114 presents the data object 106 in a final form 122 for usage. After usage, the data object 106 is preferably repackaged into the secure package 112.

The control data 116 preferably comprises control elements that control all operations relating to the usage of the object 106. The number of control elements is preferably unlimited. The data provider may define any number of control elements to represent his predetermined conditions of usage of the data object 106. A restriction, however, is that the data packaging program 110 and the user program 114 must have compatible program code to handle all the control elements. Control elements can contain data, script or program code that is executed by the user program 114 to control usage of the related data object 106. Script and program code can contain conditional statements or other statements, which are processed with the relevant object and system parameters on the user data processor 300 in order to control use of the data object 106.

Figure 1B:
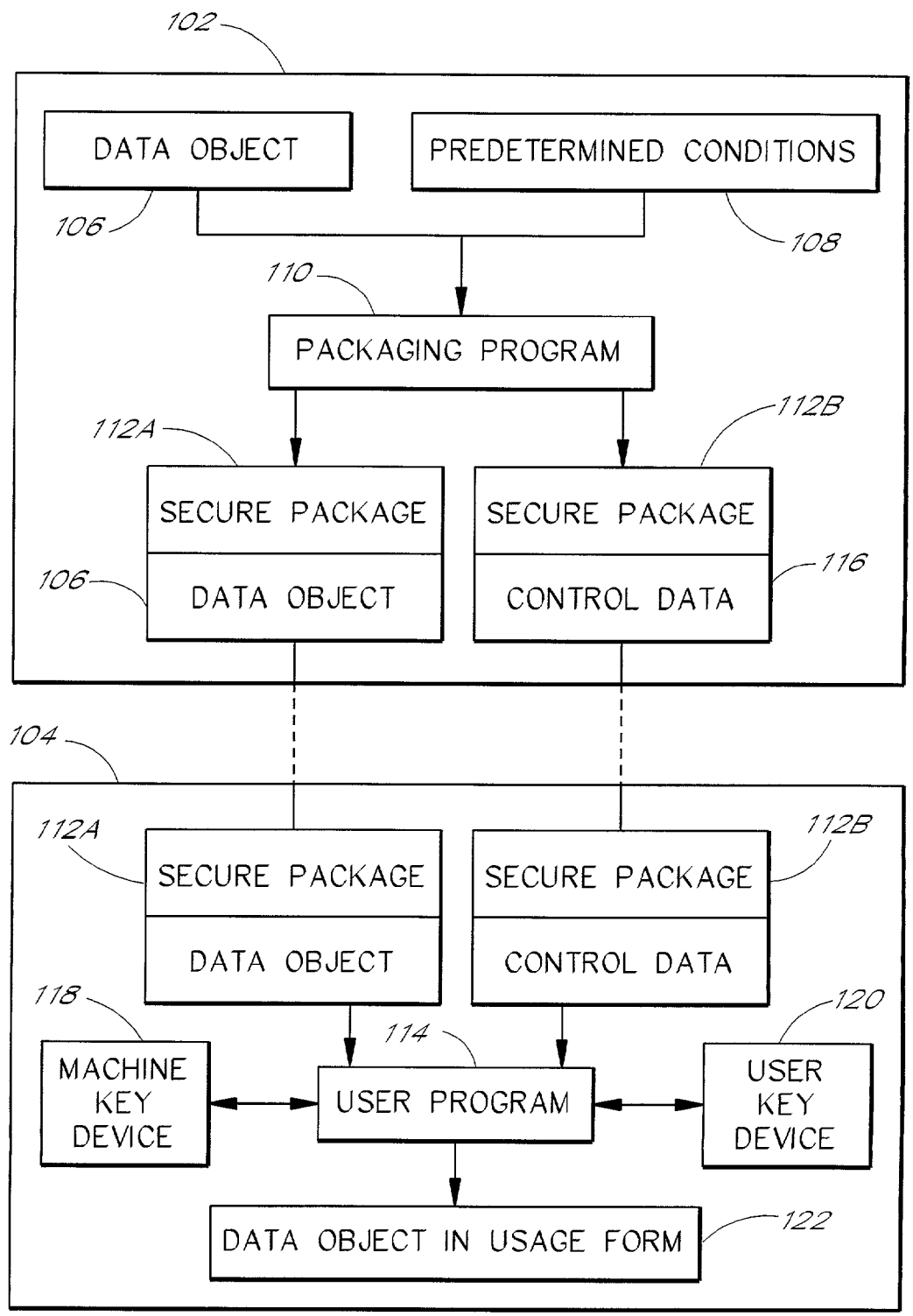
FIG. 1B illustrates a flow diagram showing the general data flow according to an alternative embodiment of the invention in which the data object and the control data are separately packaged.

FIG. 1B illustrates a flow diagram showing the general data flow according to an alternative embodiment of the invention. In the alternative embodiment, the packaging program 110 creates a separate secure package 112A-B for each of the data object 106 and the usage conditions 108. The separate secure packages 112A-B can be transmitted separately to the user program 114.

In the case of some media formats, the secure package 112 need not contain the complete data object 106. In one embodiment, only a portion of the data object 106 without which the data object 106 would be practically useless is included in the secure package 112. The portion can include up to the whole of the data object 106. In the case of digital video such as MPEG, for example, only some or all of the key frames of a video segment need to be securely packaged in order to protect the complete video segment.

II. System and Data Security

The present invention makes use of encryption technology to implement various security features. At least two types of encryption may be used in accordance with various aspects of the invention: symmetric key encryption and asymmetric key encryption.

Symmetric key encryption employs a single key for both encryption and decryption. The two parties that wish to communicate securely must both hold the symmetric key. A secure message is passed by encrypting the message with the symmetric key, transferring the message, and then decrypting the message with the same symmetric key. Symmetric key encryption can also be used to authenticate a party by sending the party a message encrypted with a symmetric key that is held by the party. If the party can decrypt the message, its identity can be verified by examining the decrypted message. One well-known system for symmetric key encryption is the Data Encryption Standard (DES), a Federal Information Processing Standard (FIPS) that describes the Data Encryption Algorithm (DEA).

Asymmetric key encryption employs a key pair, which comprises a pair of related keys typically called a public key and a private key. One of the keys is used for encryption and the other for decryption. The public key is typically published, while the private key is held secret by one party. Asymmetric key encryption allows one party to send a secure message to another party without the transfer between the parties of a "secret" key. A party that wishes to communicate with another typically encrypts a message with the other party's public key. The encrypted message is then transferred to the other party. The other party then decrypts the message with their corresponding private key. Asymmetric key encryption can also be used to authenticate a party. The party to be authenticated encrypts an identified set of data with its private key. If the encrypted data can be decrypted with the corresponding public key, then the encrypting party must have been in possession of the corresponding private key. Accordingly, the party can be authenticated assuming that the private key has not become compromised. One well-known system for asymmetric key encryption is RSA, devised at the Massachusetts Institute of Technology in 1978 by Rivest, Shamir, and Adelman.

Asymmetric key encryption technology can also be used to verify the authenticity of a message in a process known as signing a message. In this case, a one-way hash of a message is encrypted with the private key of the sender. This encrypted one-way hash is also known as a signature. The signature is sent along with the message itself. The recipient, upon receiving the message and the signature, decrypts the signature (encrypted hash) using the public key of the sender. The recipient also reproduces a hash of the received message using the same one-way hash function used by the sender. If the decrypted hash and the reproduced hash match, the message must be the same, unaltered message that was sent by the sender. In order to assure the authenticity of the public key used to verify the signature, digital certificates have been developed. A digital certificate is a public key that has been signed by a trusted authority that can vouch for the authenticity of the public key. Digital certificates can be easily disseminated and authenticated to facilitate secure communications and authentications. Symmetric key encryption technology could also be used to verify the authenticity of a message by using a symmetric key rather than an asymmetric key to encrypt the hash.

The aforementioned and additional information regarding encryption will be well known to one skilled in the art and is provided solely to facilitate the understanding of the invention by the layman. An excellent introduction to cryptography for the layman is provided by Phil Zimmermann in a document titled, "Introduction to Cryptography," which can be downloaded at www.pgpi.org/doc/guide/6.5/en/intro/ in a PDF file format. A search of the World Wide Web for PKI (public key infrastructure) will also provide several excellent resources on encryption technology.

III. System Components

A. Data Object Provider Data Processor

Figure 2:
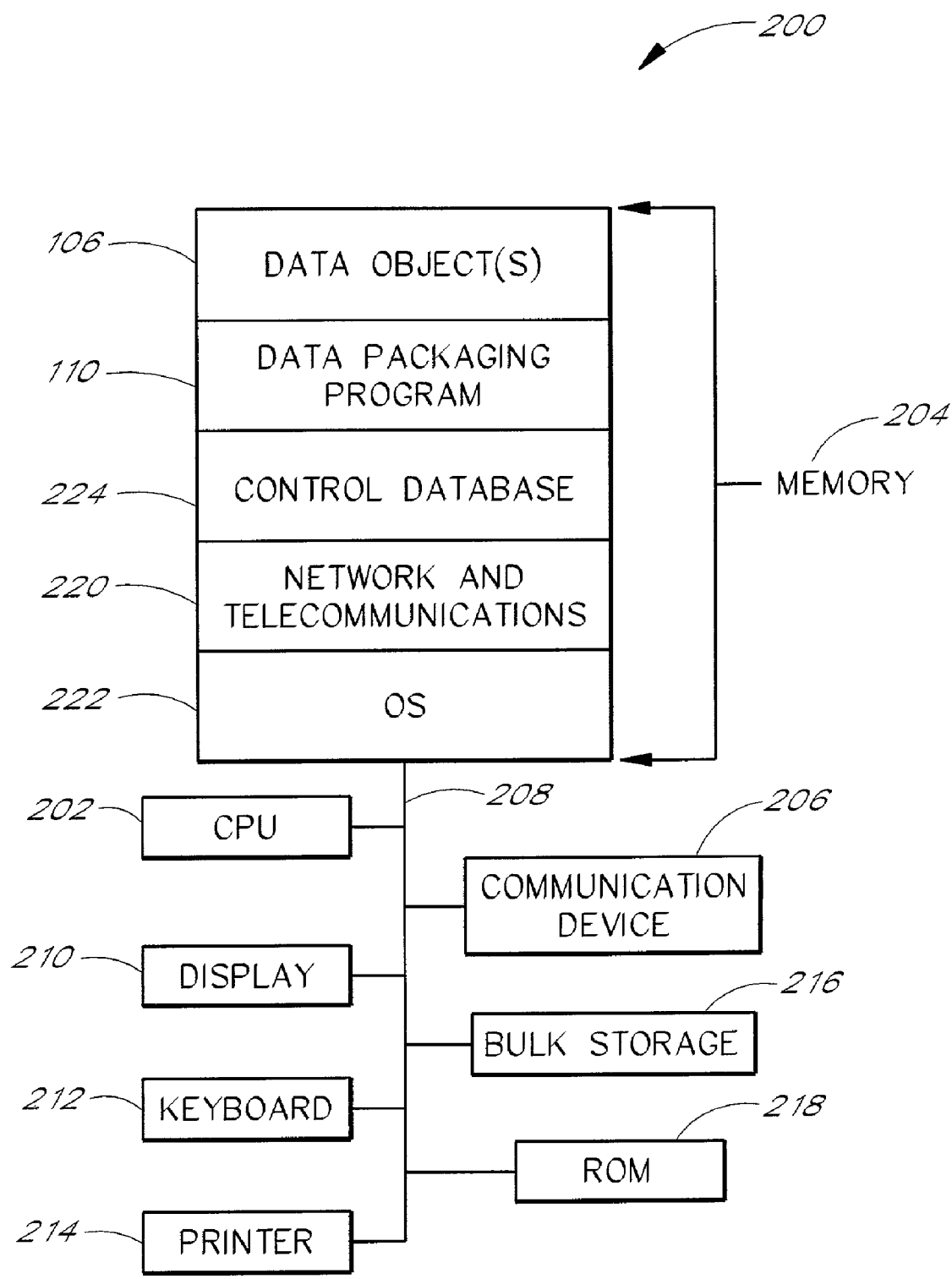
FIG. 2 illustrates a system block diagram of one embodiment of the data object provider data processor corresponding to the data object provider part of FIG. 1A.

FIG. 2 is a system block diagram of a data object provider data processor 200 in accordance with the first embodiment. As mentioned above, the data object provider may be an author of a data object, an owner of a data object, a broker of a data object or anyone else who wants to distribute a data object, while retaining the control of its usage. The data processor 200 is preferably a general or special purpose processor. The data processor 200 preferably comprises a CPU 202, a memory 204 and a communication device 206, which are interconnected by a bus 208. The communication device 206 preferably enables the data object provider data processor 300 to communicate with one or more user data processors 300 in order to transfer securely packaged data objects 112. The communication device 206 may be, for example, a media access controller (MAC), used to connect to an Ethernet or the Internet. As shown in FIG. 2, other conventional components, such as a display 210, a keyboard 212, a printer 214, a bulk storage device 216, and a ROM 218, may also be connected to the bus 208. The memory 204 preferably stores network and telecommunications programs 220, and an operating system (OS) 222. All the above-mentioned elements are well-known and commercially available. The memory 11 also stores a data packaging program 110 and, preferably, a database 224 for storage of data objects 106 and/or control data 116. Depending upon the current operation, one or more data objects 106 can be stored in the memory 204 as shown or in the bulk storage 216. The data provider's data processor 200 is preferably located in a secure environment.

B. User Data Processor

Figure 3A:
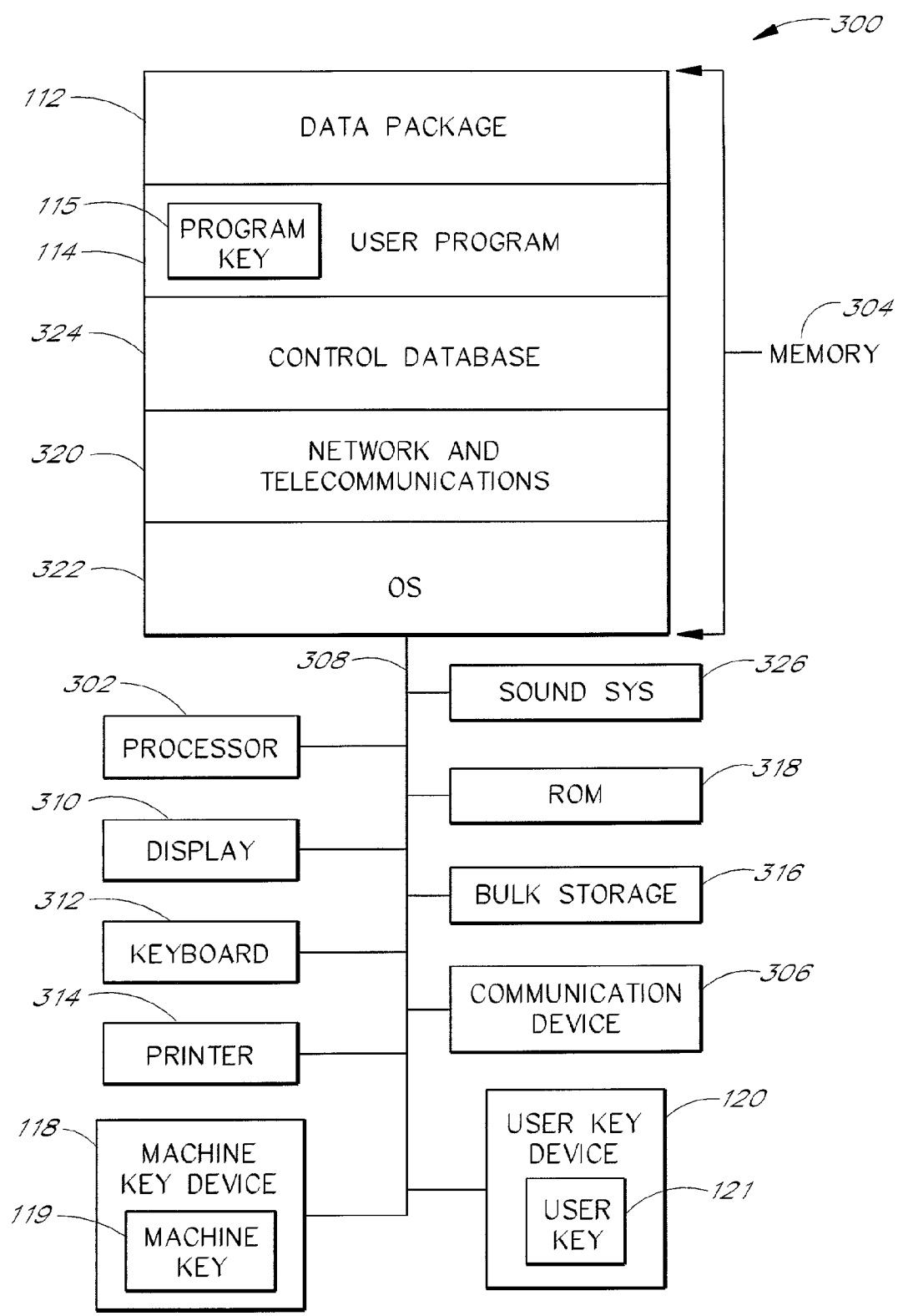
FIG. 3A illustrates one embodiment of the user data processor corresponding to the user part of FIG. 1A.

The user data processor 300, which is shown in FIG. 3A, is a general or special purpose processor. The user data processor 300 preferably comprises a CPU 302, a memory 304, and a communication device 306, which are interconnected by a bus 308. The communication device 306 preferably enables the user data processor 300 to communicate with a data object provider data processor 200 in order to receive securely packaged data objects 112. The communication device 306 may be, for example, a media access controller (MAC), used to connect to an Ethernet or the Internet. The data object provider data processor 200 and the user data processor 300 are preferably connected by a communications network (not shown). As shown in FIG. 3A, other conventional means, such as a display 310, a keyboard 312, a printer 314, a sound system 326, a ROM 318, and a bulk storage device 316, may also be connected to the bus 308. The memory 304 preferably stores network and telecommunications programs 320, and an operating system (OS) 322. All the above-mentioned elements are well-known and commercially available. For the purpose of the present invention, the memory 304 also stores a user program 114 and, optionally, a database 324 for storage of data objects 106 and/or control data 116. Depending upon the current operation, a data package 112 can be stored in the memory 304, as shown, or in the bulk storage 316. The user program 114 preferably holds a user program key 115 with which the user program 114 performs secure operations.

In an alternative embodiment, the user data processor 300 could be a peripheral device or a plug-in card that may be used in conjunction with a general-purpose computer. In this case, the data processor 300 preferably comprises a user program 114, which may be implemented in hardware or software. In still another embodiment, the user data processor 300 may be a device having the capability to decode a data object 106 and produce an output signal for a presentation device. The presentation device could be, for example, a television, a stereo, or a printer. The user data processor 300 can be a "set-top" box to be used in conjunction with televisions.

C. Key Devices

In accordance with the first embodiment of the present invention, the user data processor 300 also comprises the machine key device 118 and a user key device 120, which are connected, directly or indirectly, to the bus 308. Each key device is preferably a secure device that contains encryption and/or decryption logic and an encryption and/or decryption key or key set. In the first embodiment, the machine key device 118 contains a machine key 119, and the user key device 120 contains a user key 121. In the first embodiment, the key devices 118, 120 use asymmetric encryption/authentication in which case the machine key 119 and user key 121 are preferably the private keys of an asymmetric key pair. Alternatively, the key devices 118, 120 may use symmetric encryption in which case the machine key 119 and user key 121 would be symmetric keys. In still another embodiment, the machine key 119 and the user key 121 may be identification codes instead of encryption keys.

The machine key device 118 is generally an installed component of the user data processor 300 that is configured to be not easily portable. The machine key device 118 may be permanently attached to the user data processor 300. For example, the machine key device 118 could be integrated into the motherboard of a user data processor 300 (computer). Alternatively, the machine key device 118 could be a card that is connected through an expansion card slot of a computer such that the housing of the computer must be removed to remove the card. The user key device 120 is generally a portable or removable component of the user data processor 300 that can easily be removed and reconnected to alternative user data processors. The user key device 120 may be a smart card that can be connected to a receptacle on the user data processor 300. In the first embodiment, the machine key device 118 is associated with a user data processor 300, while the user key device 120 is associated with a user of a data object 106.

In the first embodiment, the machine key device 118 and the user key device 120 are configured to perform encryption and decryption functions. Using the encryption and decryption capabilities of the key devices 118, 120, the user program 114 can also perform the functions of message and party authentication. In the case the key devices 118, 120 use asymmetric key technology, the devices preferably are also configured to create key pairs and store private keys. The public keys can be exported from the key devices 118, 120 and digital certificates can be created from the exported keys. In the case that the key devices 118, 120 use symmetric key technology, the devices preferably store a number of symmetric keys, each of which has a time period during which the key is valid.

The functionality that is provided by the machine key device 118 can be incorporated into a secure hardware encryption/decryption device in accordance with known techniques. The functionality that is provided by the user key device 120 can be incorporated in a "smart card" or a credit card sized device having active components in accordance with known techniques.

In an alternative embodiment, the key devices 118, 120 may not include encryption functionality. In this case, the key devices 118, 120 may simply provide a symmetric or an asymmetric key; the functionality of encrypting and decrypting can be incorporated into software running on the user data processor 300, such as the user program 114. In still another embodiment, the key devices 118, 120 may simply provide a machine key 119 or user key 121 in the form of identification codes that can be read by the user program 114 without encryption to verify the identity of the user data processor or the user. For example, the machine key device 118 could be a media access controller (MAC) for the user data processor 300, from which a unique MAC address can be read. The MAC address can be used as a machine key 119 to identify the MAC, and accordingly, the user data processor 300 in which it is installed. The user key device 120 could, for example, be the keyboard 312 attached to the user data processor 300, provided that the user is prompted to input through the keyboard 312 a user key 121 in the form of an identification code that can be used to authenticate the user.

D. Security Modules

Figure 3B:
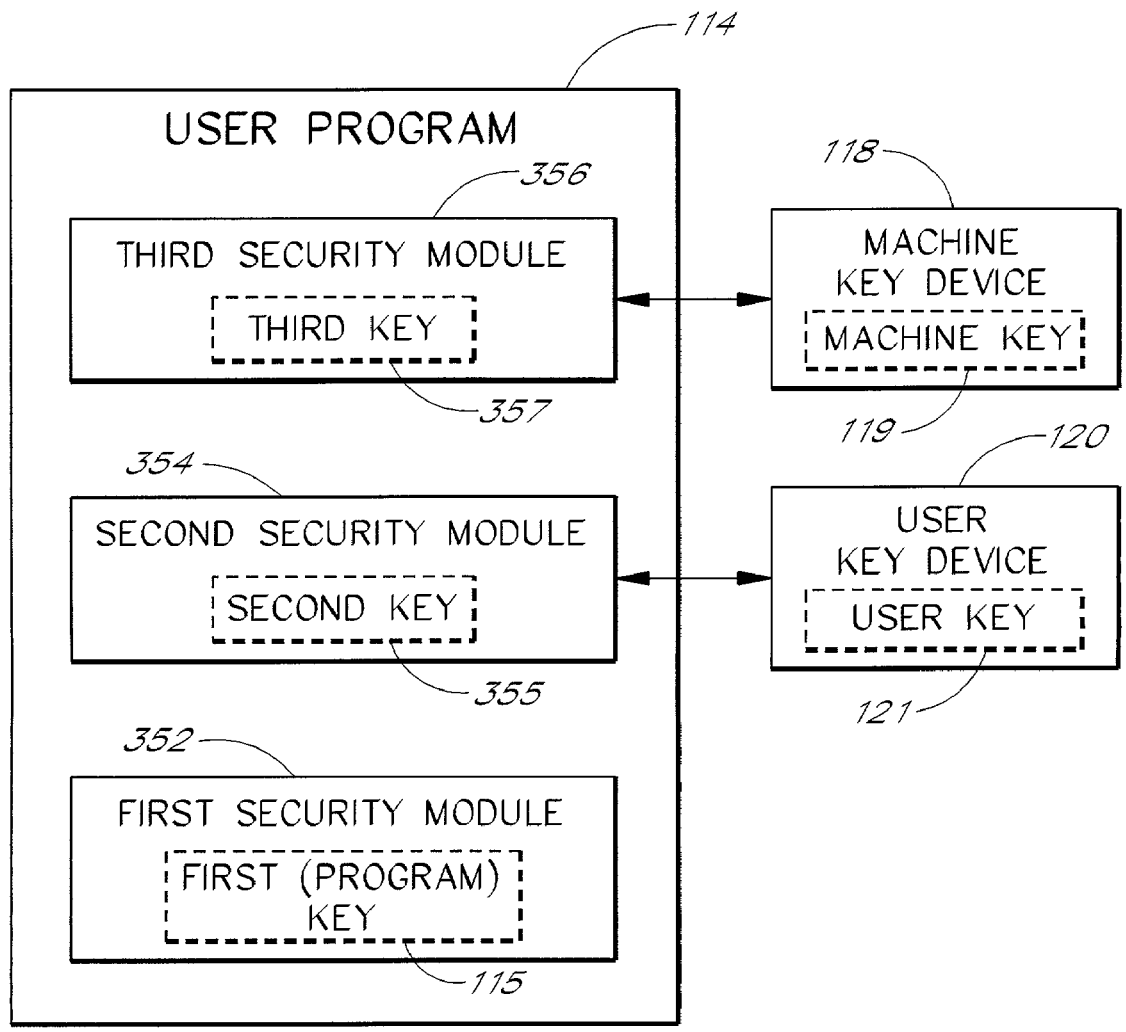
FIG. 3B illustrates a number of security modules through which the user program implements security functionality in accordance with the flow diagram of FIG. 1A.

In accordance with the first embodiment, as illustrated in FIG. 3B, the user program 114 includes a number of security modules 352, 354, and 356. The security modules 352, 354, and 356 may interface with the key devices 118, 120 and may also implement security functionality such as encryption and decryption. The security modules 352, 354, and 356 are preferably software or code sections, or program classes included in the user program code. The security modules 352, 354, and 356 may, however, be separate software modules from the user program 114. The functionality of the security modules 352, 354, and 356 may also be incorporated in one or more hardware modules.

The first security module (or the user program security module) 352 implements, for the user program 114, some or all of the encryption, decryption, message (signature) authentication, and party authentication functionality discussed above with reference to the key devices. The first security module 352 allows the user program 114 to receive a basic secure package 112 from the data object provider data processor 200. The first security module 352 uses a first key (the user program key) 115 for some or all of its security functions. The variations discussed above with reference to the key devices 118, 120 also apply to the first security module 352. For example, the user program key 115 may be a symmetric key or an asymmetric key pair.

Although the first security module 352 is included in the first embodiment, its incorporation is not essential to the functioning of the invention. The first security module 352, however, allows functionality of the second and third security modules 354, 356 to be disabled while still maintaining the ability to communicate secure packages. This feature allows a data object 106 to be used in conjunction with the system even when the data object provider does not want to restrict the use of the data object 106 to a particular user or data processor 300.

The second security module 354 interfaces with the user key device 120. In the first embodiment, the second security module 354 has minimal functionality, with most of the security functionality such as encryption, decryption, party authentication, and signature verification being handled by the user key device 120. The second security module 354 may, in this case, still include functionality sufficient to authenticate the user key device 120, in conjunction with the user key device security functionality, as described above. For example, the second security module 354 may send data to the user key device 120 which the device 120 encrypts using its private key. The second security module then authenticates the user key device 120 by decrypting the encrypted data using the corresponding public key as contained in a digital certificate. In this first embodiment, the second key 355 need not be included in the second security module 354.

In an alternative embodiment, much or all of the security functionality could be incorporated into the second security module 354, rather than the user key device 120. In this case, the user key device 120 could simply supply a user key 121, which could be the second key 355 that the second security module uses to implement the security functionality that would otherwise be incorporated into the user key device 120. In still another alternative embodiment, the user key device 120 could be minimally functional, such as supporting no more than the input of a user key 121 by a user in the form of a password or passcode through the keyboard 312. In this case, the second key 355, used by the second security module 354 for security functions would be maintained by the second security module 354 itself. The second security module 354 in this case is preferably configured to authenticate the user based upon the code supplied by the user key device 120. Further, the second security module 354, in this case, is also preferably configured to perform the required security functionality, such as decryption, upon authenticating the user. The variations discussed above with reference to the key devices 118, 120 also apply to the second security module 354. For example, the second key 115 may be a symmetric key or an asymmetric key pair.

The functional requirements of the third security module 356 are preferably similar to those of the second security module 354, but with an interface to the machine key device 118 instead. The third key 357 of the third security module 356, likewise, may not be necessary, may be the machine key 117 supplied by the machine key device 118, or may be a separate key held by the third security module 356, depending upon the embodiment chosen.

In one embodiment, the first, second, and third security modules 352, 354, and 356 can be combined into one or two modules. The modules need not be separate identifiable units within the user program 114 and may be fully integrated to the user program 114. In one embodiment, the invention need not incorporate the second security module 354 or the user key device 120, in which case user authentication and user encryption need not be performed. In another embodiment, the invention need not incorporate the third security module 356 or the machine key device 118, in which case machine authentication and machine encryption need not be performed.

IV. User and Machine Encryption of the Secure Package

A. General Embodiment of the Secure Package

Figure 4A:
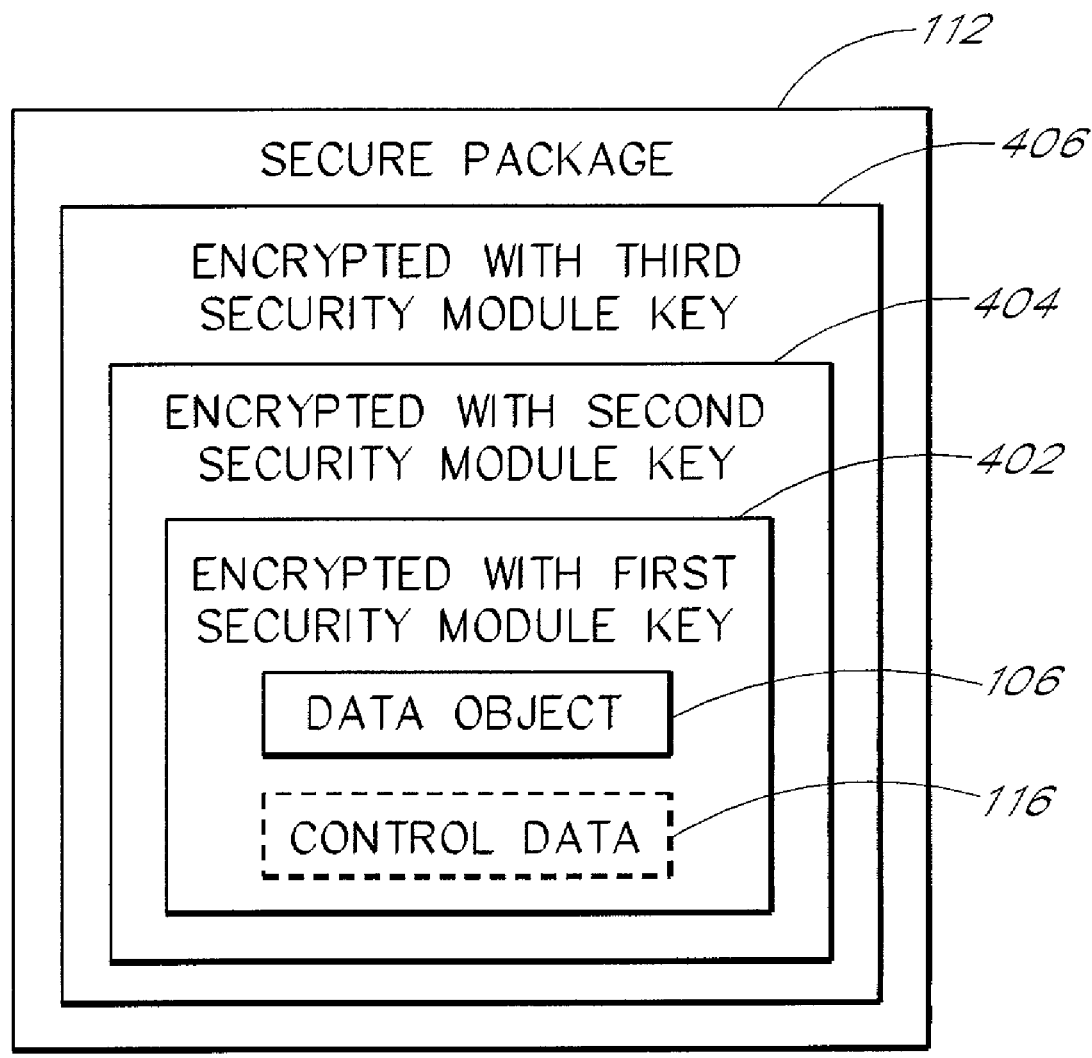
FIG. 4A illustrates a general embodiment of three layers of encryption that secure the data object within the secure package.

In a general embodiment, a data object 106 is encapsulated in a secure package 112 by successively encrypting the data object 106 for decryption by the first, second, and third security modules 352, 354, and 356. FIG. 4A illustrates three layers of encryption that secure the data object 106 within the secure package 112 in accordance with this embodiment. The data object 106 is encrypted in a first layer 402 using the first security module key 115. The data object 106 is also encrypted in a second layer 404 using the second security module key 355. The data object 106 is also encrypted in a third layer 406 using the third security module key 357. Inclusion of all three layers is not essential to the functioning of the invention, however, at least either the second layer 404 or the third layer 406 is preferably present.

As illustrated in FIG. 4A, control data 116 need not necessarily be included in the secure package 112. In this case, the encryption for the second and third security modules 354 and 356 may be used in lieu of the control data 116 in order to restrict the use of the data object 106 to a particular user or data processor 300. On the other hand, the control data 116 can be included to enable access control other than restriction of the use of the data object 106 to a particular user or data processor 300. The control data 116 may be included in the same secure package 112 as the data object 106 or in a separate secure package (e.g. 112B in FIG. 1B). The separate secure package 112B is preferably signed by the data object provider data processor 200 and may use single layer encryption, successive encryption similar to that used for the data object secure package 112A, or no encryption.

B. The Packaging Process

Figure 4B:
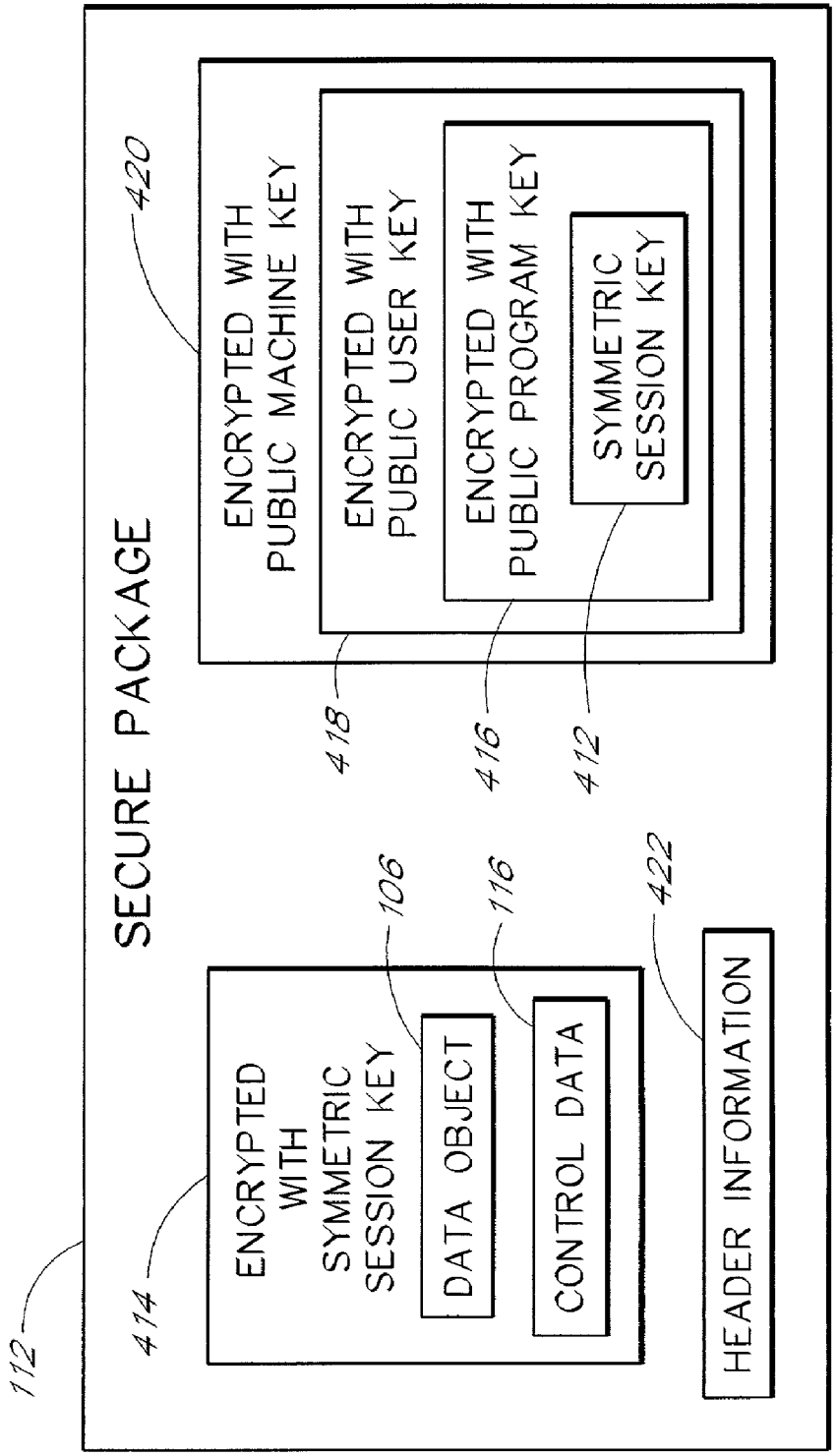
FIG. 4B illustrates the layers of encryption used to secure the data object and the control data in accordance with the flow diagram of FIG. 1A.
Figure 5A:
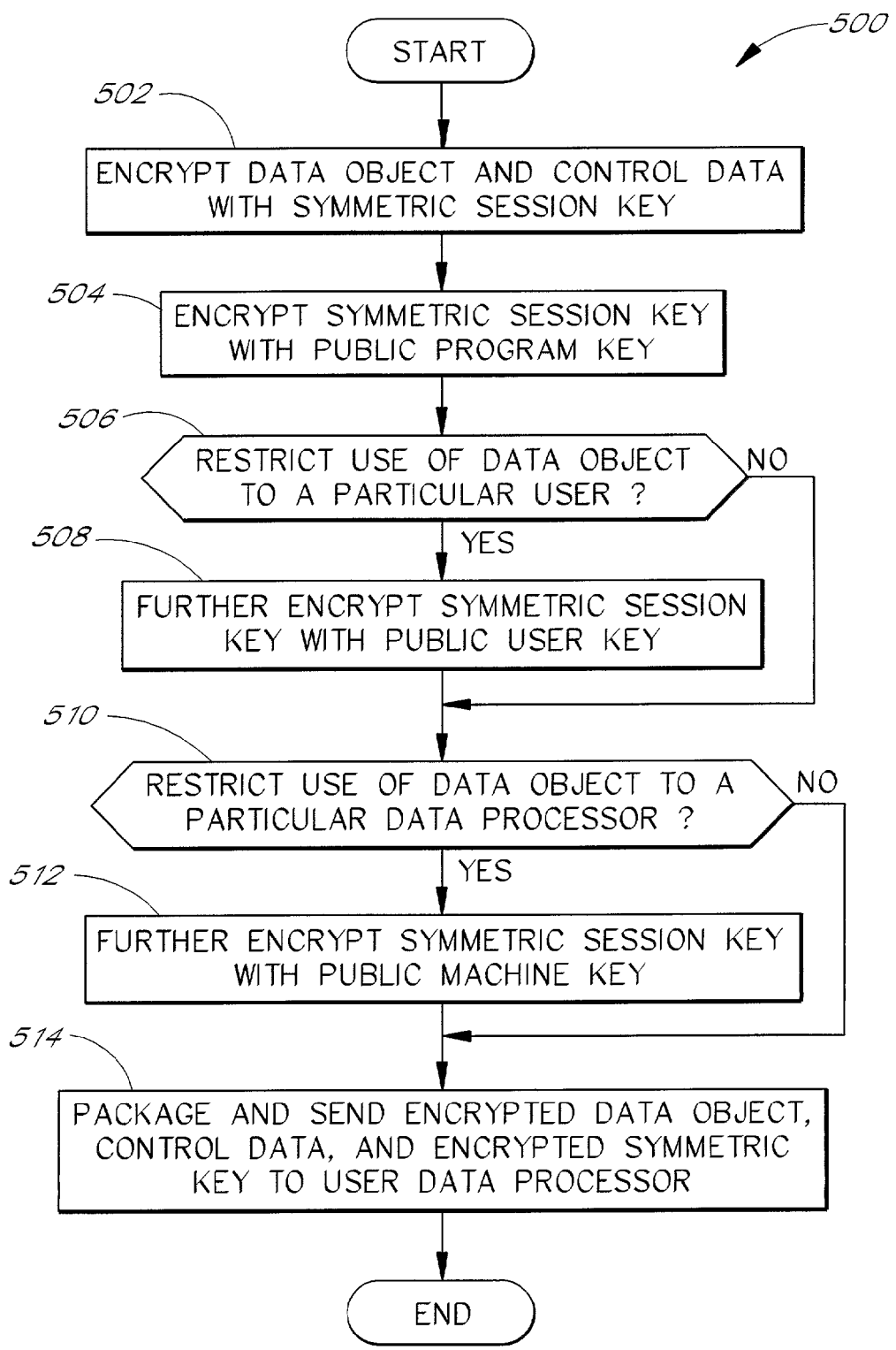
FIG. 5A illustrates a process by which the data packaging program produces the secure package in accordance with the flow diagram of FIG. 1A.

In the first embodiment, the secure package 112 is encrypted based upon a program key 115 as well as a machine key 119 and a user key 121. FIG. 4B illustrates, in accordance with the first embodiment, the layers of encryption used to secure the data object 106 and, if present, the control data 116. FIG. 4B will now be discussed in conjunction with FIG. 5A, which illustrates a process 500 by which the data packaging program 110 produces the secure package 112 in accordance with the first embodiment.

At a step 502 the data packaging program 110 generates a symmetric session key 412 and encrypts the data object 106 and the control data 116 with the key 412. The data object 106 and the control data 116 can be encrypted separately or together. As illustrated in FIG. 4B, the data object 106 and the control data 116 are encrypted in a layer 414. The symmetric session key 412 is generated and used for a single communication or communication session since information is more efficiently encrypted with symmetric than with asymmetric keys. In general, data to be securely communicated can be encrypted with the symmetric session key, and the session key in turn can be encrypted with an asymmetric key pair. This process is known as "key wrapping."

At a step 504, the data packaging program 110 encrypts the symmetric session key 412 with a public program key (wrapping the symmetric session key 412). In the first embodiment, the program key 115 is an asymmetric key pair comprising the public program key and a private program key. The asymmetric key pair is generated in advance by the user program 114 and the public key is published (preferably as a digital certificate) or transmitted to the data packaging program 114. This encryption of the symmetric session key 412 is in effect a further encryption, using the program key 115, of the data encrypted with the symmetric session key 412 itself. As illustrated in FIG. 4B, the symmetric session key 412 is encrypted in a layer 416. In the first embodiment, the layers 414 and 416 together correspond to the first layer 402 in the general embodiment described above.

In an alternative embodiment, the program key 115 may be a symmetric program key known to both the packaging program 110 and the user program 114. In this case, the symmetric session key 412 is preferably encrypted with the symmetric program key. In still another alternative embodiment, the steps 502 and 504 can be combined such that the data object 106 and the control data 116 are directly encrypted with the program key 115. In this case the session key 412 need not be used.

At a step 506 the data packaging program 110 determines whether the use of the data object 106 is to be restricted to a particular user, and if so, passes control to a step 508. If not, the data packaging program 110 skips step 508 and passes control on to a step 510. The data packaging program 110 may make this determination based upon usage conditions 108 specified by the author or data object provider. A control element included in the usage conditions will preferably specify that the data object 106 is to be restricted to a particular user.

At the step 508, the data packaging program 110 further encrypts the symmetric session key 412 with a public user key. In the first embodiment, the user key 121 is an asymmetric key pair comprising the public user key and a private user key. The asymmetric key pair is preferably generated in advance by the user key device 120 and the public key is published (preferably as a digital certificate) or transmitted to the data packaging program 114. This encryption of the symmetric session key 412 is in effect a further encryption, using the user key 121, of the data encrypted with the symmetric session key 412 itself. As illustrated in FIG. 4B, the step 508 results in an encryption layer 418, which corresponds to the second layer 404 in the general embodiment described above. In an alternative embodiment, the user key 121 may be a symmetric user key known to both the packaging program 110 and the user program 114. In this case, the symmetric session key 412 is preferably further encrypted with the symmetric user key.

At a step 510, which is similar to the step 506, the data packaging program 110 determines whether the use of the data object 106 is to be restricted to a particular data processor, and if so, passes control to a step 512. If not, the data packaging program 110 skips step 512 and passes control on to a step 514.

At the step 512, the data packaging program 110 further encrypts the symmetric session key 412 with a public machine key. In the first embodiment, the machine key 119 is an asymmetric key pair comprising the public machine key and a private machine key. The asymmetric key pair is preferably generated in advance by the machine key device 118 and the public key is published (preferably as a digital certificate) or transmitted to the data packaging program 114. This encryption of the symmetric session key 412 is in effect a further encryption, using the machine key 119, of the data encrypted with the symmetric session key 412 itself. As illustrated in FIG. 4B, the step 512 results in an encryption layer 420, which corresponds to the third layer 406 in the general embodiment described above. In an alternative embodiment, the machine key 119 may be a symmetric machine key known to both the packaging program 110 and the machine key device 118. In this case, the symmetric session key 412 is preferably further encrypted with the symmetric machine key.

At a step 514, the data packaging program 110 completes the packaging of the data object 106 and control data 116 and transmits the secure package 112 over a communications network to the user data processor 300. In the first embodiment, the encrypted data object 106 and control data 116 as well as the encrypted symmetric session key 412 are concatenated and header information 422 is prepended indicating which levels of encryption have been used in the packaging. The data is then packetized for transmission. In an alternative embodiment, the encrypted data object 106 and control data 116 may be transmitted separately from the encrypted symmetric session key 412. In still another embodiment, the data object 106 and the control data 116 can be encrypted separately with different symmetric session keys 412. Each of the different symmetric session keys 412 could then be encrypted separately in accordance with the steps 504–512. The data object 106, the control data 116 and the encrypted symmetric session keys could be then sent separately or together. In still another embodiment, the encrypted data object 106, the control data 116, and the session key 412 could each be sent separately.

C. The Unpackaging Process

Figure 5B:
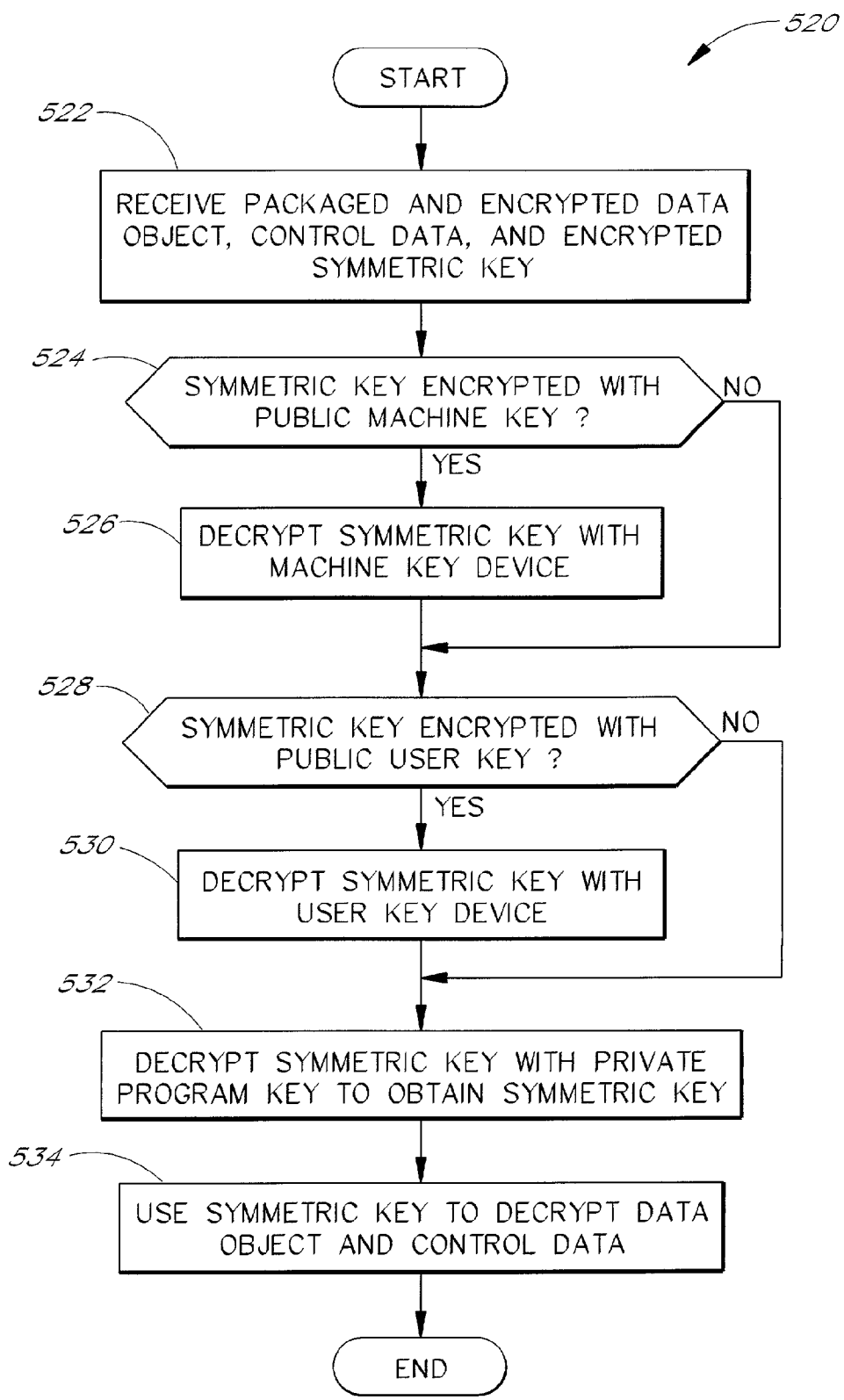
FIG. 5B illustrates a process by which the user program unpackages the secure package in accordance with the flow diagram of FIG. 1A.

FIG. 5B illustrates a process 520 by which the user program 114 unpackages the secure package 112 in accordance with the first embodiment. At a step 522, the user data processor 300 receives the secure package 112 from the data packaging program 110. The secure package 112 preferably contains the data object 106 and the control data 116 encrypted by the symmetric session key 412, as well as the multiple encrypted version of the symmetric session key 412.

At a step 524, the user program 114 determines whether the symmetric session key 412 has been encrypted with the public machine key. If so, the user program 114 proceeds on to a step 526, if not, the user program skips step 526 and proceeds on to a step 528. The user program preferably makes the step 524 determination by examining the header information 422 prepended to the secure package in step 514 of the process 500. The header information 422 preferably indicates which levels of encryption have been applied.

At the step 526, the third security module 356 (FIG. 3B) of the user program 114 at least partially decrypts the symmetric session key 412 using the machine key device 118. In the first embodiment, the machine key 119 is an asymmetric key pair comprising a public machine key and a private machine key. The machine key device 118 preferably comprises the private machine key and logic sufficient to decrypt, using the private machine key, data encrypted with the public machine key. Accordingly, the third security module 356 preferably provides the encrypted symmetric session key 412 to the machine key device 118 and is returned an at least partially decrypted symmetric session key 412. This decryption results in removal of the encryption layer 420 (FIG. 4B).

In an alternative embodiment, the machine key 119 may be a symmetric machine key known to both the packaging program 110 and the machine key device 118. The machine key device 118, in this case, performs the decryption using the symmetric machine key. In an additional alternative embodiment, the decryption functionality could be handled by the third security module 356 (FIG. 3B) of the user program 114. In this case, the machine key device 118 may simply supply the machine key 119 with which the third security module 356 decrypts the symmetric session key 412.

At the step 528, the user program 114 determines whether the symmetric session key 412 has been encrypted with the public user key. If so, the user program 114 proceeds on to a step 530, if not, the user program skips step 530 and proceeds on to a step 532.

At the step 530 the second security module 354 (FIG. 3B) of the user program 114 at least partially decrypts the symmetric session key 412 using the user key device 120. In the first embodiment, the user key 121 is an asymmetric key pair comprising a public user key and a private user key. The user key device 120 preferably comprises the private user key and logic sufficient to decrypt, using the private user key, data encrypted with the public user key. Accordingly, the second security module 354 preferably provides the encrypted symmetric session key 412 to the user key device 120 and is returned an at least partially decrypted symmetric session key 412. This decryption results in removal of the encryption layer 418 (FIG. 4B).

In an alternative embodiment, the user key 119 may be a symmetric user key known to both the packaging program 110 and the user key device 118. The user key device 120, in this case, performs the decryption using the symmetric user key. In an additional alternative embodiment, the decryption functionality could be handled by the second security module 354 (FIG. 3B) of the user program 114. In this case, the user key device 120 may simply supply the user key 121 with which the second security module 354 decrypts the symmetric session key 412.

At the step 532, the first security module 352 of the user program 114 decrypts the symmetric key 412 using the private program key. In the first embodiment, the program key 115 is an asymmetric key pair comprising a public program key and the private program key. The first security module 352 preferably comprises logic for decrypting, using the private program key, data encrypted with the public program key. This decryption results in removal of the encryption layer 416 and accordingly provides the symmetric session key 412.

At a step 534, the user program 114 uses the decrypted symmetric session key 412 to decrypt the data object 106 and the control data 116. This decryption results in removal of the encryption layer 414. The functionality necessary to remove the encryption layer 414 may be incorporated into the first security module 352 or it may be incorporated into the user program 114 itself. Once the data object 106 and the control data 116 are exposed, the user program 114 can present to the user the data object 106 in accordance with the rules or control elements specified in the control data 116.

V. User and Machine Authentication

A. General Embodiment

Figure 6A:
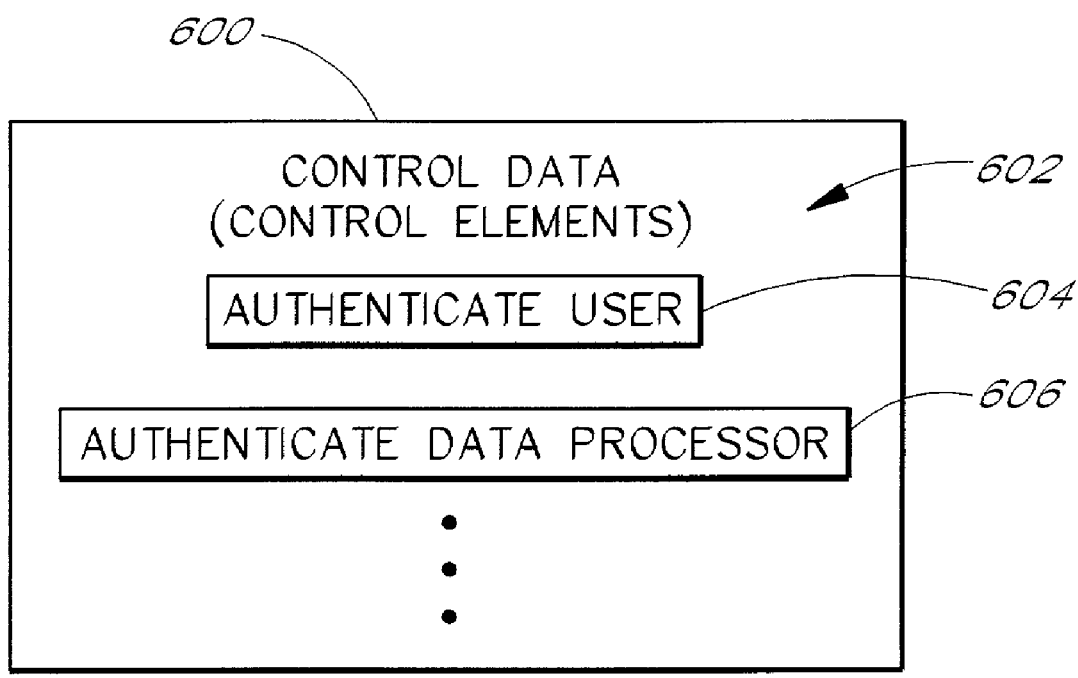
FIG. 6A illustrates a general embodiment of a set of control data that restricts use of a data object to a particular user and a particular data processor.

FIG. 6A illustrates a general embodiment of a set of control data 600 that restricts use of a data object 106 (FIG. 1) to a particular user and a particular data processor 300. The set of control data 600 comprises a number of control elements 602. A first control element 604 contains rules or instructions that restrict use of the data object 106 to a particular user by authenticating the user. A second control element 606 contains rules or instructions that restrict use of the data object 106 to a particular data processor by authenticating the data processor 300.

The set of control data 600 can be used in conjunction with the process 500 to further protect the data object 106 against unauthorized use. In the case that a illegitimate entity "breaks" the encryption provided through the process 500, the illegitimate entity will then have to break the security features provided by the control data 600 in conjunction with the user program 114 in order to gain access to the data object 106. Furthermore, the security features provided by the control data 600 can be used independently of the process 500 in order to restrict the use of a data object 106 to a particular data processor 300 or user.

B. Generating the Control Elements

Figure 6B:
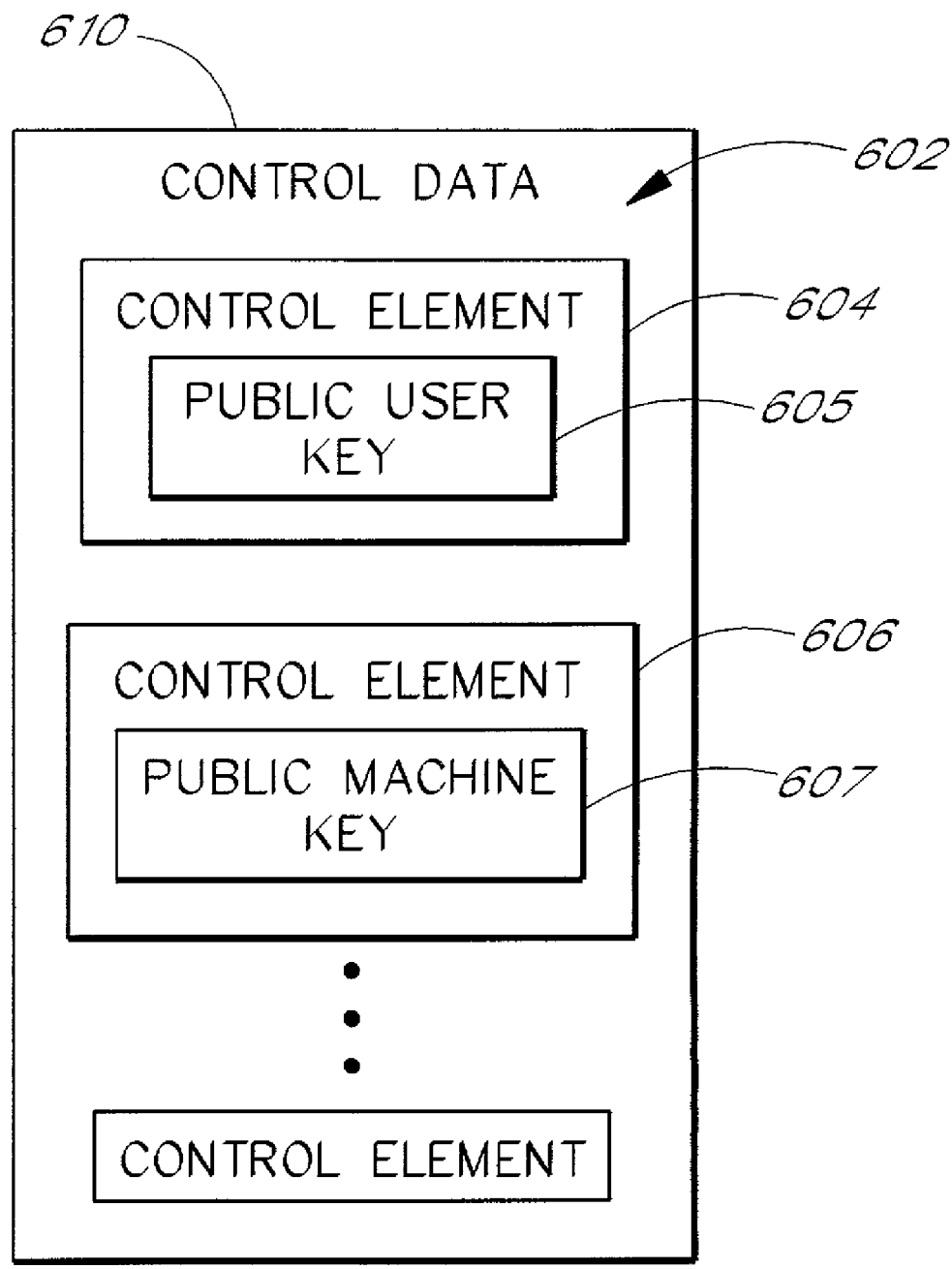
FIG. 6B illustrates a set of control data in accordance with the flow diagram of FIG. 1A.
Figure 7A:
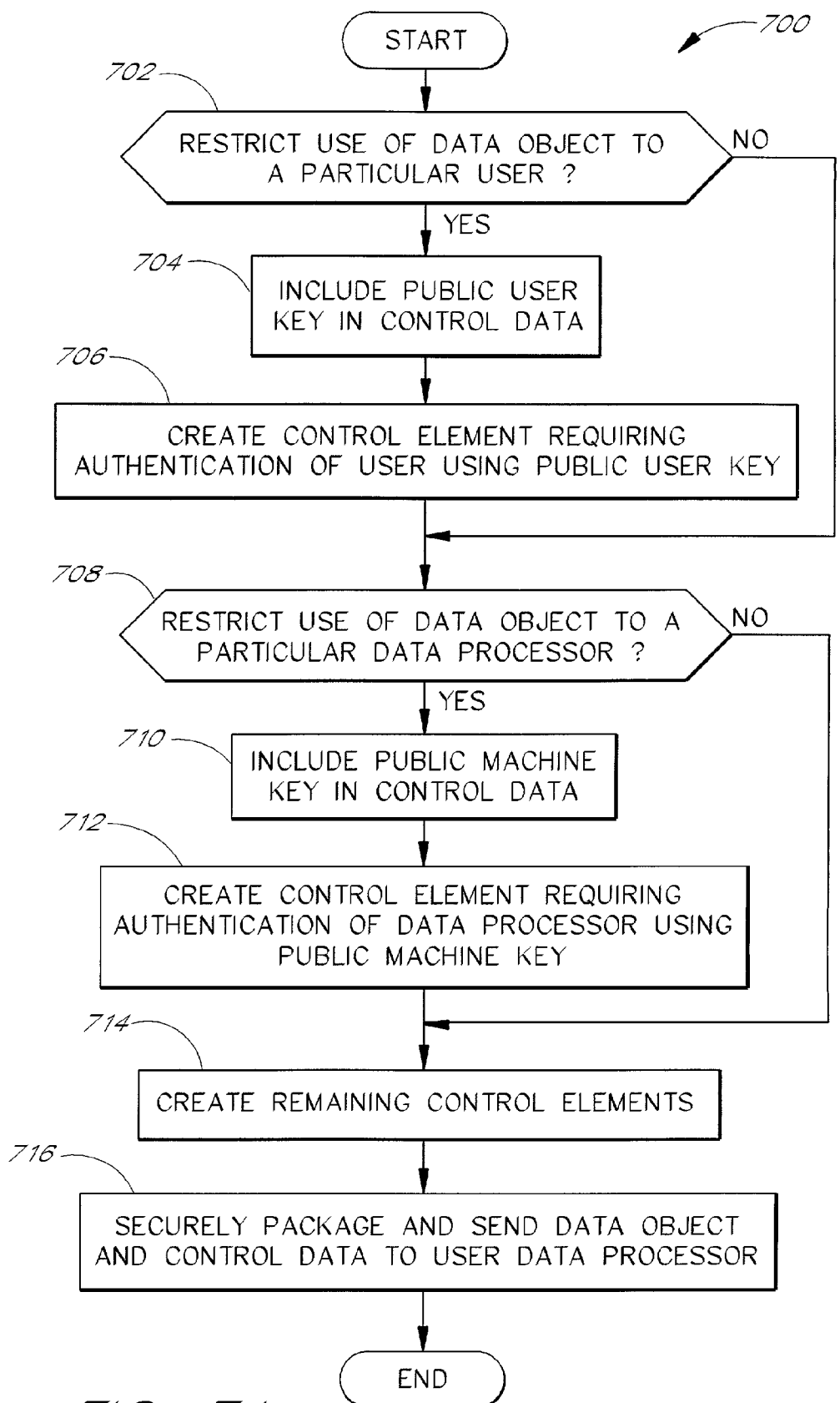
FIG. 7A illustrates a process by which the data packaging program produces the set of control data in accordance with the flow diagram of FIG. 1A.

FIG. 6B illustrates a set of control data 610 in accordance with the first embodiment. The first control element 604 restricts the use of the data object 106 to a particular user through the use of the public user key 605 (discussed in section IV above). The second control element 606 restricts the use of the data object 106 to a particular data processor through the use of the public machine key 607 (discussed in section IV above). FIG. 6B will now be discussed in conjunction with FIG. 7A, which illustrates a process 700 by which the data packaging program 110 produces the set of control data 610 in accordance with the first embodiment.

At a step 702, the data packaging program 110 determines whether the use of the data object 106 is to be restricted to a user, and if so, passes control to a step 704. If not, the data packaging program 110 skips step 704 and a subsequent step 706 and passes control on to a step 708. The determination of step 702 is preferably identical to the determination made in step 506 of the process 500.

At step 704, the data packaging program 110 includes the public user key 605 in the control data 610. In the first embodiment, the user key 121 is an asymmetric key pair comprising the public user key and a private user key. At step 706 the data packaging program creates the first control element 604. The public user key 605 may be contained within the first control element 604 or may be included separately within the control data 610. The first control element 604 preferably comprises data, script, or program code sufficient to instruct the user program 114 to authenticate the user based upon the public user key 605. In an alternative embodiment, a user ID or password could be used in place of the public user key 605.

At a step 708, the data packaging program 110 determines whether the use of the data object 106 is to be restricted to a particular data processor 300, and if so, passes control to a step 710. If not, the data packaging program 110 skips step 710 and a subsequent step 712 and passes control on to a step 714. The determination of step 708 is preferably identical to the determination made in step 510 of the process 500.

At step 710, the data packaging program 110 includes the public machine key 607 in the control data 610. In the first embodiment, the machine key 119 is an asymmetric key pair comprising the public machine key and a private machine key. At step 712 the data packaging program creates the second control element 606. The public machine key 607 may be contained within the second control element 606 or may be included separately within the control data 610. The second control element 606 preferably comprises data, script, or program code sufficient to instruct the user program 114 to authenticate the data processor 300 based upon the public machine key 607. In an alternative embodiment, a machine identifier, such as a MAC address (described in section III-C above) could be used in place of the public machine key 607.

At the step 714, the data packaging program 110 creates the remaining control elements 602 that govern the use of the data object 106. The remaining control elements can specify, for example, the number of allowed uses of the data object 106, the kinds of uses, such as printing as opposed to just viewing, and the duration of use.

At a step 716, the data packaging program 110 securely packages and sends the data object 106 and the control data 116 to the user data processor 300. In the first embodiment, the step 716 preferably comprises the process 500 of FIG. 5A. In alternative embodiments other secure packaging and/or communication processes may be used in accordance with known techniques.

C. Application of the Control Elements

Figure 7B:
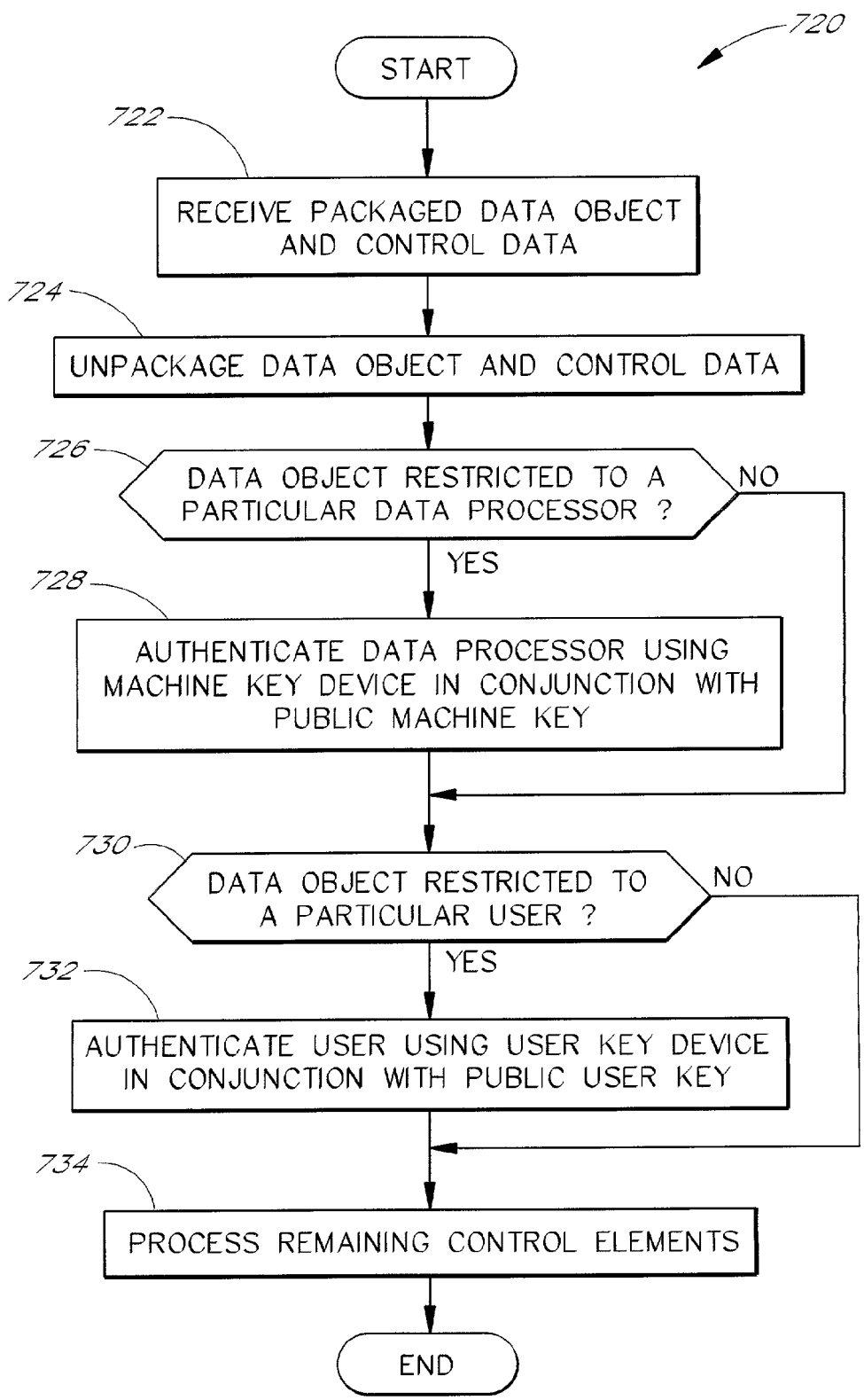
FIG. 7B illustrates a process by which the user program applies the control elements to restrict the use of the data object to a particular user and/or a particular data processor 300 in accordance with the flow diagram of FIG. 1A.

FIG. 7B illustrates a process 720 by which the user program 114 applies the control elements 602 to restrict the use of the data object 106 to a particular user and/or a particular data processor 300 in accordance with the first embodiment. At a step 722 the user data processor 300 receives the packaged data object 106 and control data 116 from the data packaging program 110. At a step 724 the user program 114 unpackages the data object 106 and the control data 116. In the first embodiment, the step 724 preferably comprises the process 520 of FIG. 5B.

At a step 726, the user program 114 determines whether the use of the data object 106 is restricted to a particular data processor. If so, the user program 114 proceeds on to a step 728, if not, the user program skips step 728 and proceeds on to a step 730. The user program preferably makes the step 726 determination by examining the control elements 602. The presence of the second control element 606, restricting use of the data object 106 to a particular data processor 300, causes the user program 114 to make a positive determination in step 726. The absence of such a control element causes a negative determination.

At the step 728, the third security module 356 of the user program 114 authenticates the identity of the user data processor 300 using the machine key device 118 in conjunction with the public machine key 607. In the first embodiment, the third security module 356 sends a random data element to the machine key device 118. The machine key device 118, in turn, encrypts the random data element with the private machine key, held by the machine key device 118. The machine key device 118, in turn, sends the encrypted random data element back to the third security module 356. The third security module 356 then decrypts the encrypted random data element with the public machine key contained in the control data 112. If the decrypted random data element matches the original random data element, the public machine key 607 contained in the control data 116 must match the private machine key held by the machine key device 118; in this case the data processor 300 has been authenticated. If the third security module 356 is not able to authenticate the data processor 300, the user program 114 preferably displays an error message to the user and discontinues processing of the data object 106.

In alternative embodiments, other methods of authenticating the data processor 300 can be used. For example, a MAC (media access controller) address could be used in lieu of the public machine key 607. The machine key device 118 in this case is preferably the MAC, which may not contain encryption functionality. Accordingly, the third security module 356 may simply verify that the machine key device 118 has supplied a correct MAC address.

At the step 730, the user program 114 determines whether the use of the data object 106 is restricted to a particular user. If so, the user program 114 proceeds on to a step 732, if not, the user program skips step 732 and proceeds on to a step 734. The user program preferably makes the step 730 determination by examining the control elements 602. The presence of the first control element 604, restricting use of the data object 106 to a particular user, causes the user program 114 to make a positive determination in step 730. The absence of such a control element causes a negative determination.

At the step 732, the second security module 354 of the user program 114 authenticates the identity of the user using the user key device 120 in conjunction with the public user key 605. The second security module 354 performs the step 732 in a manner similar to that of the step 726. If the third security module 356 is not able to authenticate the user, the user program 114 preferably displays an error message to the user and discontinues processing of the data object 106.

In alternative embodiments, other methods of authenticating the user can be used. For example, a user ID or password could be used in lieu of the public user key 605. The user key device 120 in this case could be the keyboard 312 through which the user may input a user ID or password. Accordingly, the second security module 354 may simply verify that the user has supplied the correct user ID or password.

At a step 734 the user program 114 continues to process the remaining control elements 602 in accordance with which the user is granted access to the data object 106.

VI. Conclusion

It will be apparent to one skilled in the art that various encryption techniques can be used in conjunction with the packaging and authentication aspects of the present invention. Some of these techniques have been described in sections II, III-C, and III-D above.

Although the invention has been described in terms of certain embodiments, other embodiments that are apparent to those of ordinary skill in the art, including embodiments which do not provide all of the features and advantages set forth herein, are also within the scope of this invention. Accordingly, the scope of the invention is defined by the claims that follow. In the claims, a portion shall include greater than none and up to the whole of a thing; encryption of a thing shall include encryption of a portion of the thing. In the method claims, reference characters are used for convenience of description only, and do not indicate a particular order for performing the method.

What is claimed is:

1. A user data processor for providing access to a rights controlled data object, the user data processor comprising:
   a processing device;
   a communications device connected to the processing device and configured to receive an encrypted secure package containing a portion of the rights controlled data object and having at least three secure layers requiring decryption;
   a user program running on the processing device, the user program configured to control access to the rights controlled data object;
   a user program security module configured to at least partially decrypt a first secure layer of the secure package using a user program key associated with the user program;
   a user key device associated with a user, the user key device detachably connected to the processing device, accessible by the user program, and configured to restrict the use of the data object to the user using a user key for decrypting a second secure layer of the secure package; and
   a machine key device connected to and associated with the processing device and accessible by the user program, the machine key device configured to restrict the use of the data object to the user data processor using a machine key for decrypting a third secure layer of the secure package.

2. The user data processor of claim 1, wherein the user program is configured to communicate with the machine key device to authenticate the identity of the processing device using the machine key.

3. The user data processor of claim 2, wherein the processing device is configured to provide rights controlled access to digital video.

4. The user data processor of claim 1, wherein the user program is configured to communicate with the machine key device to authenticate the identity of the processing device using the machine key.

5. The user data processor of claim 4, wherein the machine key is an asymmetric machine key pair comprising a public machine key and a private machine key.

6. The user data processor of claim 5, wherein the machine key device is configured to generate the asymmetric machine key pair.

7. The user data processor of claim 1, wherein the user program is configured to communicate with the machine key device to authenticate the identity of the processing device using the machine key, and wherein the user program is configured to communicate with the user key device to authenticate the identity of the user using the user key.

8. The user data processor of claim 1, further comprising:
a second security module configured to at least partially decrypt the secure package using a second key; and
a third security module configured to at least partially decrypt the secure package using a third key.

9. The user data processor of claim 8, wherein the second security module is configured to communicate with the user key device to authenticate the identity of the processing device using the user key, and wherein the third security module is configured to communicate with the machine key device to authenticate the identity of the processing device using the machine key.

10. The user data processor of claim 8, wherein the second key is a portion of the user key, wherein the second security module is configured to obtain the second key from the user key device, wherein the third key is a portion of the machine key, and wherein the third security module is configured to obtain the third key from the machine key device.

11. The user data processor of claim 10, wherein the second security module and the third security module are parts of the user program.

12. The user data processor of claim 1, further comprising a third security module configured to at least partially decrypt the secure package using a third key.

13. The user data processor of claim 12, wherein the third security module is configured to communicate with the machine key device to authenticate the identity of the processing device using the machine key.

14. The user data processor of claim 13, wherein the third key is the media access controller (MAC) address of the user data processor.

15. The user data processor of claim 12, wherein the third key is a portion of the machine key, and wherein the third security module is configured to obtain the third key from the machine key device.

16. The user data processor of claim 15, wherein the third security module is a part of the user program.

17. The user data processor of claim 1, wherein the user program is implemented in hardware.

18. The user data processor of claim 1, wherein the user program security module is part of the user program.

19. The user data processor of claim 1, wherein the processing device is a general purpose computer.

20. The user data processor of claim 1, wherein the processing device and the machine key device are contained in a single integrated circuit.

21. The user data processor of claim 1, wherein the user key device provides encryption and decryption functionality for the user.

22. The user data processor of claim 1, wherein the machine key device provides encryption and decryption functionality for the user data processor.

23. The user data processor of claim 1, wherein the user key is used for decryption.

24. A method of restricting the use of a data object, the method comprising:
(A) associating a user program key with a user program configured to run on a user data processor;
(B) determining whether the use of the data object is to be restricted to a particular user data processor;
(C) associating a machine key device with the particular user data processor, wherein the machine key device is accessible by the user program, and wherein the machine key device maintains a portion of a machine key;
(D) encrypting the data object such that decryption of a first secure layer and a second secure layer of the encrypted data object requires the user program key and the machine key, respectively;
(E) determining whether the use of the data object is to be restricted to a particular user;
(F) associating a user key device with the particular user, wherein the user key device is accessible by the user program, and wherein the user key device maintains a portion of a user key; and
(G) encrypting the data object such that decryption of a third secure layer of the encrypted data object requires the user key.

25. The method of claim 24, further comprising:
(H) providing control elements for controlling the use of the data object through the user program;
(I) transmitting the encrypted data object to the user data processor; and
(J) transmitting the control elements to the user data processor.

26. The method of claim 25, further comprising:
(K) digitally signing the control elements such that the control elements can be authenticated; and
(L) transmitting the digital signature of the control elements to the user data processor.

27. The method of claim 26, wherein the machine key is an asymmetric machine key pair comprising a public machine key and a private machine key.

28. The method of claim 24, wherein (D) comprises:
encrypting the data object with a session key, and
encrypting the session key such that decryption requires the user program key and the machine key.

29. The method of claim 24, wherein the user key is an asymmetric user key pair comprising a public user key and a private user key.

30. A method of restricting the use of a rights controlled data object, the method comprising:
(A) associating a user program key with a user program configured to run on a user data processor;
(B) encrypting the data object such that decryption of a first secure layer of the encrypted data object requires the user program key;
(C) determining whether the use of the data object is to be restricted to a particular user data processor;
(D) associating a machine key device with the particular user data processor, wherein the machine key device is accessible by the user program, and wherein the machine key device maintains a portion of a machine key for decrypting a second secure layer of the encrypted data object;
(E) creating a machine control element configured to cause the user program to restrict use of the data object to the particular user data processor by authenticating the particular user data processor based upon at least the machine key and by at least communicating with the machine key device;

(F) transmitting the encrypted data object and the machine control element to the user data processor;

(G) including the machine control element in a set of control elements configured to cause the user program to control access to the data object;

(H) signing the set of control elements, wherein (F) comprises transmitting the signed set of control elements;

(I) determining whether the use of the data object is to be restricted to a particular user;

(J) associating a user key device with the particular user, wherein the user key device is accessible by the user program, and wherein the user key device maintains a portion of a user key for decrypting a third secure layer of the encrypted data object;

(K) creating a user control element configured to cause the user program to restrict use of the data object to the particular user by authenticating the particular user based upon at least the user key and by at least communicating with the user key device; and (L) including the user control element in the set of control elements.

31. The method of claim 30, wherein the machine key is an asymmetric machine key pair comprising a public machine key and a private machine key.

32. The method of claim 31, wherein (E) comprises including in the machine control element a digital certificate comprising the public machine key.

33. The method of claim 30, further comprising (M) encrypting the data object such that decryption also requires the machine key.

34. A method of restricting the use of a data object, the method comprising:

(A) associating a user program key with a user program configured to run on a user data processor;

(B) determining whether the use of the data object is to be restricted to a particular user data processor;

(C) associating a machine key with the particular user data processor;

(D) encrypting the data object such that decryption requires the user program key and the machine key;

(E) transferring the encrypted data object to the user data processor;

(F) determining whether the data object has been encrypted such that decryption requires the machine key;

(G) decrypting a first secure layer and a second secure layer of the data object using the user program key and the machine key, respectively;

(H) determining whether the use of the data object is to be restricted to a particular user;

(I) associating a user key with the particular user;

(J) encrypting the data object such that decryption also requires the user key;

(K) determining whether the data object has been encrypted such that decryption requires the user key; and (L) decrypting a third secure layer of the data object using the user key.

35. The method of claim 34, wherein (D) comprises:

encrypting the data object with a symmetric session key, and encrypting the symmetric session key such that decryption requires the user program key and the machine key, and wherein (G) comprises:

decrypting the symmetric session key with the user program key and the machine key, and decrypting the data object using the decrypted symmetric session key.

36. The method of claim 35, wherein the user program key is an asymmetric user program key pair comprising a public user program key and a private user program key.

37. The method of claim 35, wherein the user program key is a symmetric key.

38. The method of claim 35, wherein the machine key is an asymmetric machine key pair comprising a public machine key and a private machine key.

39. A secure data package for controlling the use of a data object, the package comprising a controlled portion of the data object, the controlled portion encrypted such that decryption of a first secure layer and a second secure layer of the encrypted data object requires both a user program key and a machine key, respectively, wherein a portion of the user program key is maintained by and associated with a user program configured to run on a user data processor to provide controlled access to the data object, wherein the user data processor has a permanently attached machine key device configured to maintain the machine key, and wherein the controlled portion comprises an essential portion of the data object, wherein the controlled portion is additionally encrypted such that decryption of a third secure layer of the encrypted data object requires a user key, wherein the user key is maintained by a user key device associated with a particular user and detachably connected to the processing device.

* * * * *